US005312084A

United States Patent [19]

Weh

[11] Patent Number: 5,312,084

[45] Date of Patent: May 17, 1994

[54] SUPPLY FITTING FOR GAS CYLINDER VALVES, PARTICULARLY OF ACETYLENE CYLINDERS

[75] Inventor: Erwin Weh, Illertissen, Fed. Rep. of Germany

[73] Assignee: WEH GmbH, Verbindungstechnik, Illertissen, Fed. Rep. of Germany

[21] Appl. No.: 985,483

[22] Filed: Dec. 4, 1992

[30] Foreign Application Priority Data

Dec. 5, 1991 [DE] Fed. Rep. of Germany ... 9115142[U]

[51] Int. Cl.⁵ .............................................. F16L 29/00

[52] U.S. Cl. .................................. 251/148; 251/89.5; 251/149.6; 251/251

[58] Field of Search ............. 137/614, 614.01, 614.02; 251/89.5, 148, 349, 297, 251, 149.6

[56] References Cited

U.S. PATENT DOCUMENTS

| | | | |
|---|---|---|---|
| 1,927,170 | 9/1933 | Hornor | 251/148 |
| 2,680,546 | 6/1954 | Seaberg | 137/614 X |
| 3,147,761 | 9/1964 | Lecocq | 251/148 X |
| 3,809,121 | 5/1974 | Harris | 251/148 X |
| 4,546,956 | 10/1985 | Moberg | 251/149.6 |
| 5,048,565 | 9/1991 | Oi | 251/149.6 X |

FOREIGN PATENT DOCUMENTS

| | | |
|---|---|---|
| 598186 | 6/1934 | Fed. Rep. of Germany . |
| 664158 | 8/1938 | Fed. Rep. of Germany . |
| 720005 | 4/1942 | Fed. Rep. of Germany . |
| 9012886.9 | 10/1990 | Fed. Rep. of Germany . |
| 600211 | 12/1977 | Switzerland . |

*Primary Examiner*—A. Michael Chambers
*Assistant Examiner*—Kevin L. Lee
*Attorney, Agent, or Firm*—Lowe, Price, LeBlanc & Becker

[57] ABSTRACT

The supply fitting for gas cylinder valves, particularly of acetylene cylinders, consists of a housing provided with a supply inlet and a portion for engaging and retaining a gas cylinder vlave, which portion is formed with a supply outlet, a piston sleeve, which is movably mounted and sealed in the housing and displaceable against the force of a spring and comprises a valve member, which is formed with a through passage and is biased by a spring to its sealing position and is adapted to open a supply passage through the housing after the supply fitting has been attached to a gas cylinder valve, and means for holding the piston sleeve in position before and after the supply fitting has been attached to a gas cylinder valve. In a preferred embodiment the means for holding the piston sleeve in position comprise an eccentric actuating mechanism with associated detent means for preventing an inadvertent adjustment. The supply fitting can reliably and safely be handled also by unskilled persons.

25 Claims, 7 Drawing Sheets

FIG. 8
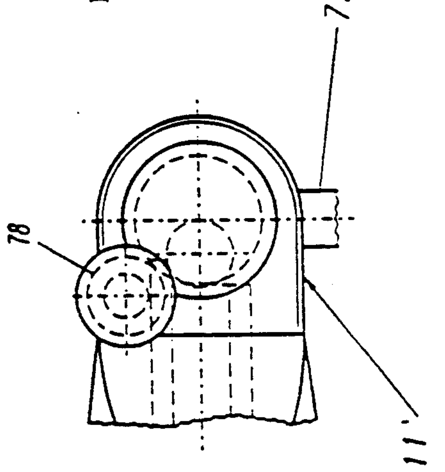
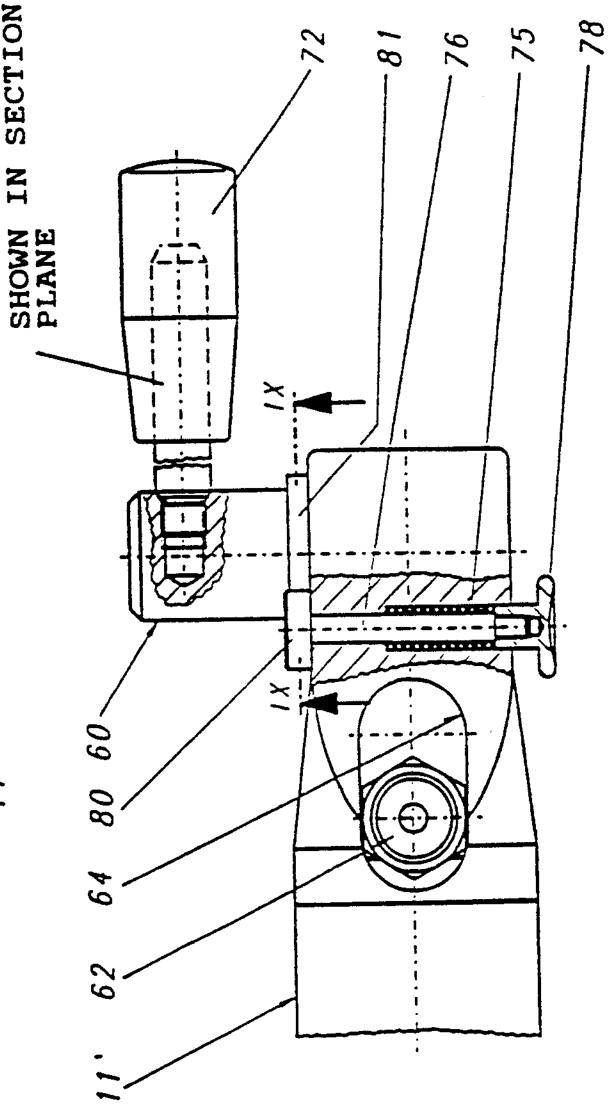
FIG. 7
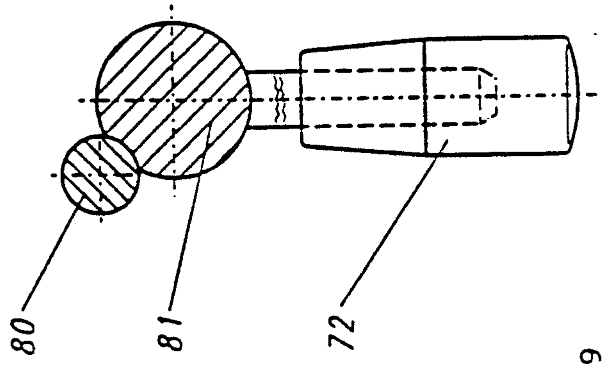
FIG. 9

SUPPLY FITTING FOR GAS CYLINDER VALVES, PARTICULARLY OF ACETYLENE CYLINDERS

BACKGROUND OF THE INVENTION

1. Field of the Invention

This invention relates to a supply fitting for gas cylinder valves, particularly of acetylene cylinders.

2. Description of the Prior Art

Supply fittings previously employed to fill gas cylinders must be secured to the gas cylinder valve by means of a U-shaped clamp. For that purpose it is necessary carefully to check the position in which the supply fitting is attached and firmly to screw the U-shaped clamp in position while making sure that the supply fitting is tightly attached. For this reason the mounting of such supply fittings on gas cylinder valves is rather complicated and time-consuming.

SUMMARY OF THE INVENTION

It is an object of the invention to provide for gas cylinder valves, particularly of acetylene cylinders, a supply fitting with which a reliable connection can be made and eliminated even by unskilled persons.

That object is accomplished in accordance with the invention by the characterizing features of claim 1. Preferred further features of such supply fittings in accordance with the invention are apparent from the dependent claims.

The supply fitting provided in accordance with the invention for gas cylinder valves, particularly of acetylene cylinders, comprises a housing provided with a supply inlet and a portion which is integrally formed with the housing and serves to engage and retain the cylinder valve and is formed with a supply outlet. A piston sleeve for connection to the cylinder valve is movably mounted in the housing and is displaceable againts the force of a spring and comprises a valve member that is formed with a passage and is biased to a sealing position by a spring and when connected to the cylinder valve opens up a supply passage through the housing. Suitable means are provided for reliably holding the piston sleeve in a position of rest before it is connected to the cylinder valve and in its connected position after it has been connected to the cylinder valve.

Owing to said features of the invention the supply fitting in accordance with the invention can be connected to and detached from gas cylinder valves very quickly and easily and the desirable cooperation of the functional elements permit the supply fitting to be reliably manipulated even by unskilled persons.

According to a preferred feature of the invention the holding means comprise at least one coupling element, which positively holds the piston sleeve in position at least before it is connected. A plurality of coupling elements rather than a single one may desirably be provided and may act on the piston sleeve by exerting forces which are distributed as easily as possible. Each coupling element may have associated with it a complementary portion for a positive retention.

A guiding and actuating member is preferably provided for the holding means, which guiding and actuating member is biased relative to the housing toward the portion for engaging and retaining the cylinder valve and is preferably displaceably mounted in the housing. The guiding and actuating member is provided with the supply inlet and with a passage leading to the valve member. That design permits the supply fitting to have a very compact design, in which the functional cooperation resulting in the filling position and the non-filling position of the fitting is particularly effective.

According to a further preferred feature of the invention the guiding and actuating member has at least one cagelike passage for receiving an associated coupling element, the surrounding housing has associated internal receiving spaces provided with cam faces, and the piston sleeve is formed on its outside periphery with respective associated locking recesses for locking the piston sleeve in position at least before it is connected to the cylinder valve. In that case the piston sleeve before it is attached to the gas cylinder valve will reliably be held in that at least one coupling element is locked in an associated locking recess and in that position the locking engagement of the coupling element is reliably ensured in a simple manner by the cam face provided on the housing. As a result, the manipulation of the supply fitting is extremely simple because when the supply fitting has been attached the piston sleeve owing to the biasing force exerted thereon can be engaged with the gas cylinder valve simply in that each coupling element is permitted to leave the associated locking recess.

Similarly, the piston sleeve when it has been connected to the cylinder valve can be held by positively acting means, optionally by means of the same coupling element. According to an alternative in accordance with the invention the piston sleeve is provided on its outside periphery with a surface with which each coupling element can be non-positively engaged under the action of the cam faces at the associated internal receiving spaces of the housing. The combination of the positive engagement with the piston sleeve before it is connected and the non-positive holding of the piston sleeve when it has been connected is desirable particularly because it will always ensure that the piston sleeve is held in an optimum position in a tubular port of the gas cylinder valve owing to the biasing force exerted on the piston sleeve relative to the guiding and actuating member and the piston sleeve will then be locked in that optimum engaging position or locking position because the coupling element is urged against the outside engaging surface of the piston sleeve by a force which is due to the biasing of the guiding and actuating member relative to the housing.

The coupling element may consist of suitable geometrical bodies, such as rollers, pins and the like. The actuation of each coupling element will be particularly simple if it consists of a ball, as is preferred. Insertable balls having the required hardness and a suitable size are commercially available in a high quality so that the use of that simple component will facilitate the manufacture of the supply fitting.

According to a preferred further feature of the invention the biasing of the piston sleeve, the biasing of the valve member and the biasing of the guiding and actuating member are effected by means of suitably designed compression springs and the means for biasing the guiding and actuating member relative to the housing preferably comprise a plurality of compression springs, which are small in diameter and are radially evenly distributed and abut on associated flange portions.

According to a further desirable feature of the invention the piston sleeve contains an interposed ring, which engages the piston sleeve at a step-shaped extension thereof, on which the compression spring abuts which serves to bias the piston sleeve, and that compression spring is guided by portions of the piston sleeve and of the guiding and actuating member. The interposed ring preferably provides also an abutment for the compression spring for the valve member.

According to a preferred feature of the invention the piston sleeve comprises a tapered guiding portion, which serves to guide the valve member and extends into a cylinder valve-receiving space formed in the engaging and retaining portion, the sealing seat for the valve member is formed in the tapered portion and when the valve member is in its seated position is contacted by a sealing ring of the valve member, and the valve member in its seated position protrudes beyond the guiding section into the space for receiving the cylinder valve. That design permits the piston sleeve to be easily engaged with and inserted into the gas cylinder valve and ensures that the passage extending through the valve member will be opened when the piston sleeve is in its connected position because the valve member is depressed against the spring force of the biased compression spring as the gas cylinder valve is in engaged with the piston sleeve.

The engaging and retaining portion of the housing may be formed with a closed, e.g., annular, profile. For the manipulation it will be particularly desirable if the engaging and retaining portion has a lateral opening for receiving the cylinder valve so that the cylinder valve can be inserted through said opening into the cylinder valve-receiving space by a lateral movement. It will also be preferable to form in the engaging and retaining portion a profile for engaging the cylinder valve and preferably to provide the engaging and retaining portion with an adjustable engagement-controlling element for a simple and accurate positioning of the supply fitting, which engagement-controlling element is disposed opposite to the piston sleeve. That engagement-controlling element desirably consists of a headless screw, which is fixed by a lock nut and has a tip which extends into a conical bore, which is usually provided on the rear side of the gas cylinder valve.

To facilitate the manipulation of the supply fitting a further preferred feature resides in that one or more recesses are formed on the outside of the housing.

According to a desirable alternative design of the supply fitting the seal for holding the piston sleeve in position is provided with an eccentric actuating mechanism, which preferably axially engages the piston sleeve. In that case the piston sleeve can safely and reliably be held in its position of rest before it is connected to the cylinder valve and in its connected position after the sleeve has been connected to the cylinder valve, and the position can be indicated on the outside by a lever by which the actuating eccentric can be rotated.

The eccentric actuating mechanism preferably comprises an eccentric shaft, which is movably mounted in the housing at least at one point and has an eccentric portion, which is engaged by an interposed element for exerting a force on the piston sleeve, and the eccentric shaft can be rotated from the outside by means of the lever.

According to a further preferred embodiment of the invention the eccentric actuating mechanism is provided with detent means for locking said mechanism, particularly the lever, against an inadvertent release. The detent means preferably comprises a stem, which is movably mounted in the housing and is biased in the engaging direction and is provided with a pushbutton at one end and with a disk profile at the other end, and a profiled section for engaging the disk profile is formed adjacent to the bearing means and to the eccentric shaft.

In the alternative design provided with an eccentric actuating mechanism the supply fitting is provided with a tubular port, which is connected to the piston sleeve and is preferably an elbow and is secured to the position sleeve and extends laterally outwardly out of the housing through a slot.

Further details, features and advantages of the invention will become apparent from the following detailed description, in which the invention will be described more in detail with reference to the accompanying drawings.

BRIEF DESCRIPTION OF THE DRAWINGS

FIG. 7 is a top plan view showing that portion of the supply fitting which is adjacent to the eccentric actuating mechanism and serves to explain the detent means.

FIG. 8 is a bottom view coordinated with FIG. 7.

FIG. 9 is a sectional view taken on section line IX—IX in FIG. 7.

DETAILED DESCRIPTION OF THE PREFERRED EMBODIMENTS

Figure 1:
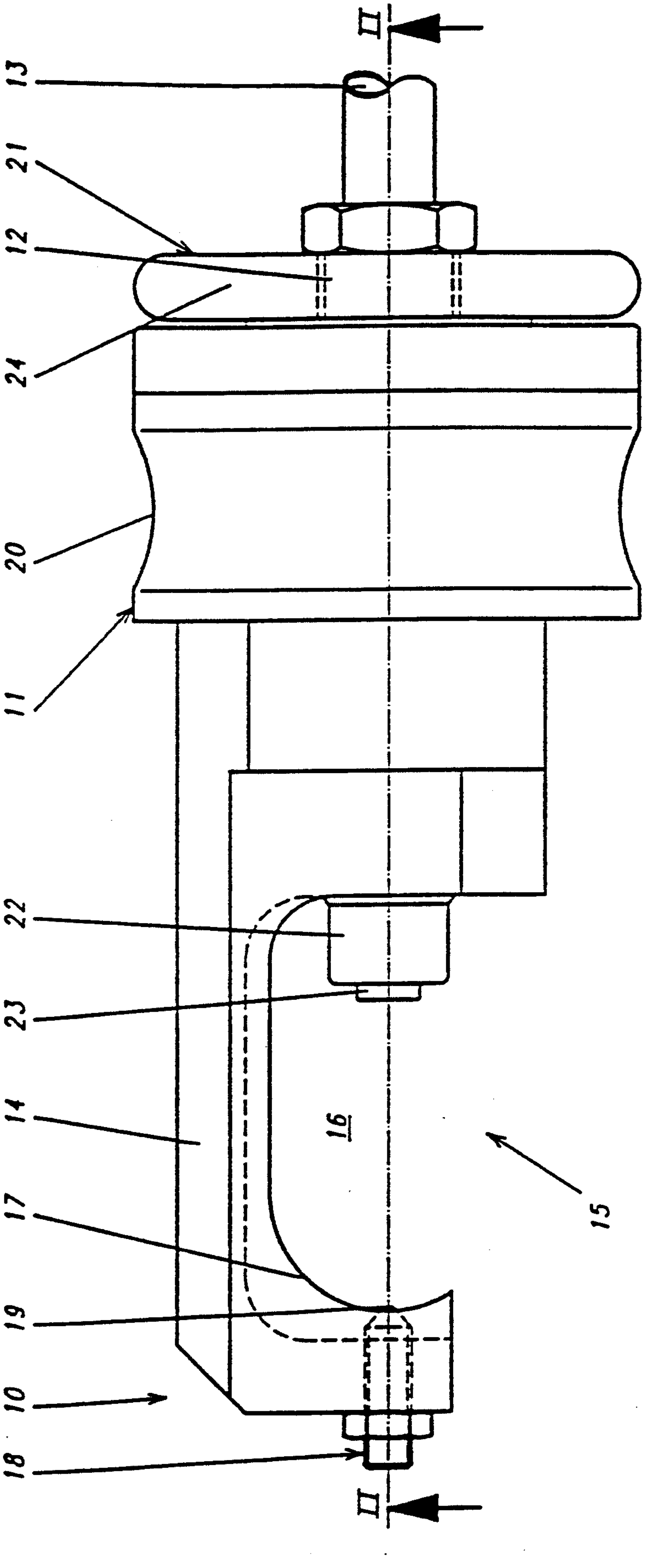
FIG. 1 is a top plan view showing an illustrative embodiment of a supply fitting before it is attached to a cylinder valve.
Figure 3:
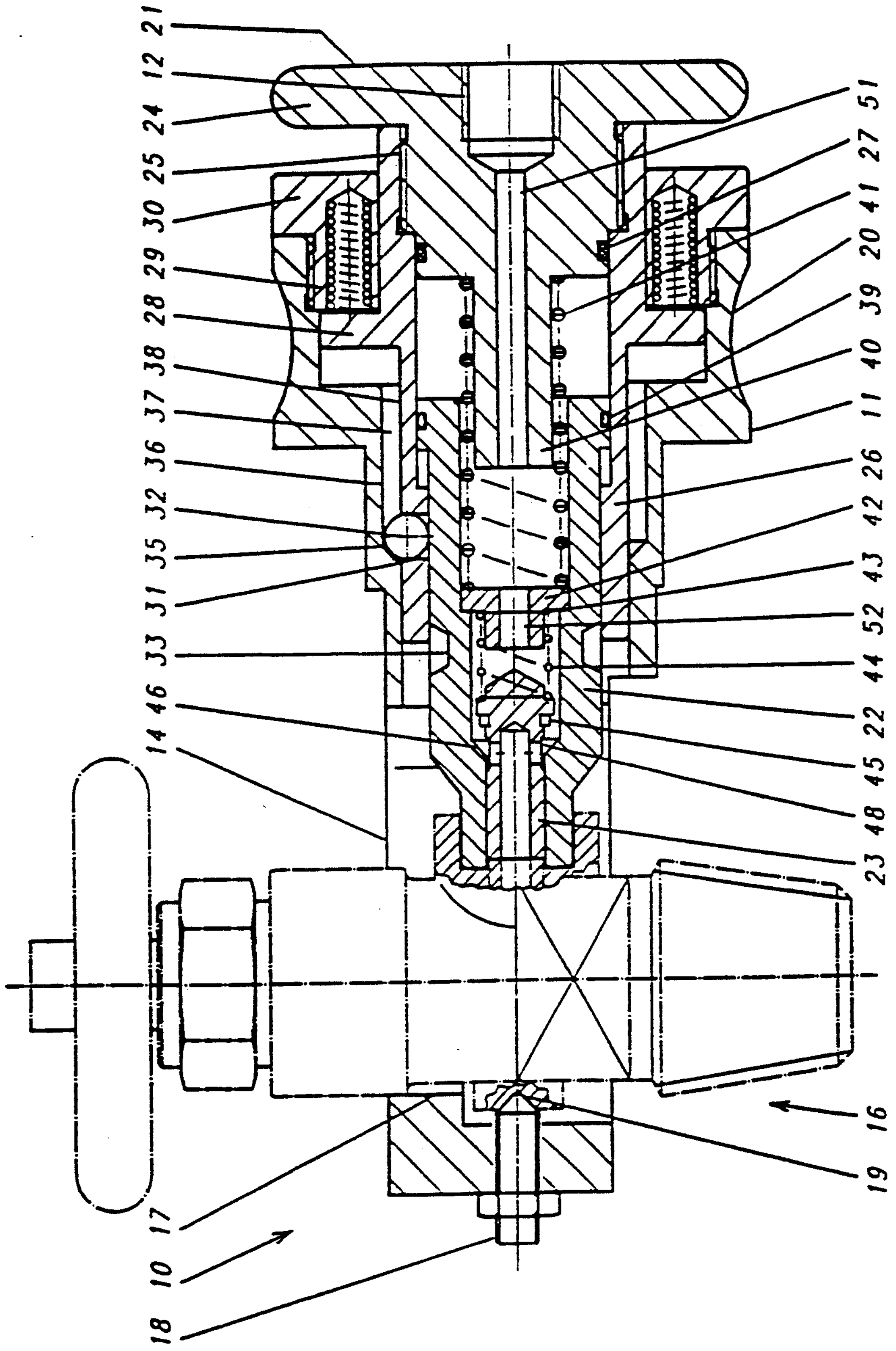
FIG. 3 is a sectional view which is similar to FIG. 2 but shows the supply fitting which has been connected to a cylinder valve, which is shown in broken lines.

FIG. 1 is a top plan view showing a supply fitting for use with gas cylinder valves, particularly of acetylene cylinders, as is indicated in FIG. 3 by broken lines.

The supply fitting 10 comprises a cylindrical housing 11, which is provided on the right side with a supply inlet 12, which is indicated by broken lines and into which an adapter is screwed, which is provided with a schematically indicated supply hose 13. It is apparent from FIGS. 2 and 3 that the supply inlet consists of a blind bore and has internal screw threads. Alternatively, the supply inlet may be provided with different port means, which may also project on the outside.

At that end which is opposite to the supply inlet 12 the housing 11 is formed with a portion 14 for engaging and retaining the cylinder valve. That portion 14 has a lateral opening 15, through which the cylinder valve can be inserted into a space 16 for receiving the cylinder valve. In a top plan view the portion for engaging and retaining the cylinder valve constitutes a clamp and as is apparent from FIG. 3 the cylinder valve-receiving space 16 distinctly exceeds the size of a standard gas cylinder valve which is to be introduced, particularly the size of such a valve for acetylene cylinders. The retaining and engaging portion 14 is also formed with a profiled surface 17 for engaging the cylinder valve. The retaining and engaging portion 14 also comprises an adjustable engagement-controlling element, which consists of a headless screw 18, the longitudinal axis of symmetry of which coincides with the longitudinal axis of the supply inlet 12 and with the section line II—II; see also FIGS. 2 and 3.

The headless screw 18 has a centering top 19 for insertion into a standard conical bore provided on the rear side of the gas cylinder valve; see FIG. 3.

The housing 11 is provided at that end which is remote from the portion 14 with an annular peripheral recess 20 for manipulation. The supply inlet 12 is formed in a guiding and actuating member 21, the rear end of which protrudes on the rear side of the housing 11 and is symmetrical with respect to the axis extending through the section line II—II and is disklike and formed with a rounded rim.

A forward end of a piston sleeve 22 extends into the space 16 for receiving the cylinder valve and is aligned with the headless screw 18 and the supply inlet 12 and symmetrical with respect to their longitudinal axis. The piston sleeve is movably mounted and sealed in the housing 11 and is adapted to be displaced against a biasing force toward the portion 14 for engaging and retaining the cylinder valve and in the direction of the above-mentioned longitudinal axis of symmetry. A hollow valve member 23 is slidably mounted in the piston sleeve 22 and is biased to its sealing position and when the supply fitting 10 has been mounted on a cylinder valve opens a supply passage through the housing 11.

Figure 2:
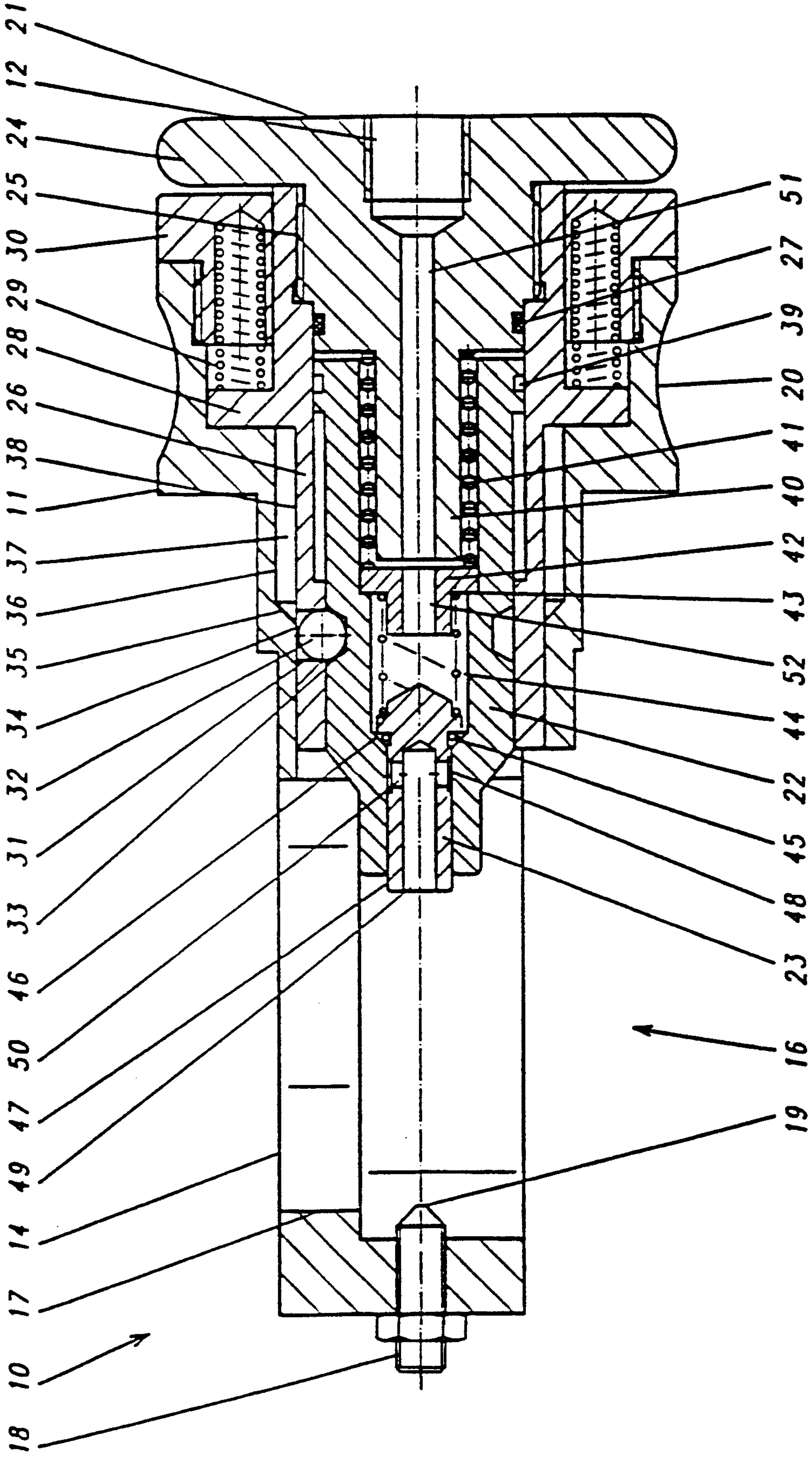
FIG. 2 is a sectional view taken on section line II—II in FIG. 1.

FIG. 2 shows the interior of the supply fitting 10 in a position in which the supply fitting is not attached to a cylinder valve. The hose 13 and its screw adapted have been omitted in FIGS. 2 and 3 for the sake of simplicity.

The guiding and actuating member 21 consists of two parts, namely, an actuating part 24 and a guiding part 26. The actuating part 24 extends into the interior of the housing 11 and by external screw threads 25 is screwed to the guiding part 26. An additional seal is established by a sealing member 27. The guiding part 26 is integrally formed with a radial flange 28, which serves as an abutment for radial compression springs 29, which are evenly distributed around the periphery and are guided in a screwed-on housing flange 30. The compression springs 29 bias the guiding and actuating member 21 relative to the housing 11.

The guiding part 26 of the guiding and actuating member 21 consists of a sleeve, which extends toward the space 16 for receiving the cylinder valve and like a cage is provided with through openings 31 for receiving and guiding coupling elements consisting of balls 32. In FIG. 2 a ball 32 is shown in the position which that ball assumes before the supply fitting is mounted on the cylinder valve. In that position the ball 32 has entered a radial locking recess 33, which is formed on the outside of the piston sleeve 22 and consists of an annular peripheral V-shaped groove. In that position the ball 32 is retained by a cam face 34, which is formed at a cylindrical internal bore 11. As is apparent from FIG. 2 the cam face 34 merges via a cam face 35, that is inclined 45°, into a cam face 36, which i enlargement adjacent to the cam faces 36 relative to the diameter of the inside surface of the bore adjacent to the cam faces 34 is so dimensioned that an internal receiving space 37 is provided, into which the ball 32 can enter in such a manner, as is shown in FIG. 3, that the piston sleeve 22 ia no longer positively held by the ball 32 but can be non-positively held at an engaging surface 38 provided on the outside peripheral surface of the piston sleeve, as is shown in FIG. 3.

The piston sleeve 22 is slidably mounted in the guiding part 26 of the guiding and actuating member 21 and is sealed by a seal 39. The actuating part 24 comprises a tubular port 40, which extends into the housing to a large extent and serves to guide a compression spring 41, which abuts at one end on the actuating part 24 and on at the other hand on an interposed ring 42, which within the piston sleeve 22 engages a stepped portion 43. As a result, the compression spring 41 acts between the guiding and actuating member 21 and the piston sleeve 22.

The opposite end of the interposed ring 42 comprises a tubular extension for receiving and guiding a compression spring 44, which biases the valve member 23. As is apparent from FIG. 2 the head of the valve stem 23 is provided with an annular seal 45, which in the illustrated sealing position engages a valve seat 46, which is formed in a tapered portion of the piston sleeve 22. The valve member 23 comprises a stem portion 47, which is slidably mounted in a tapered guiding portion 48 of the piston sleeve 22. The stem portion 47 is formed with a blind bore 49 and with radial bores 50 opening into the blind bore 49. When the supply fitting has been mounted, the blind bore 49 and the radial bores 50 constitute a part of the path along which the fluid is supplied through the supply inlet 12, a central bore 51 adjoining the supply inlet 12, and a bore 52 in the interposed ring into the space which contains the compression spring 44.

Also with reference to FIG. 3 the handling of the supply fitting 10 will now be explained more in detail. Before the supply fitting 10 is attached, it is in the state shown in FIG. 2. The piston sleeve 22 is locked by the ball 32 and the stem 47 of the valve member 43 protrudes through the tapered guiding portion 48 of the piston sleeve 22 into the space 16 for receiving the cylinder valve. The remainder of that space 16 is so large that a gas cylinder valve can be inserted through a lateral entrance opening 15 into the space 16 as is indicated by broken lines in FIG. 3. In that operation the cylinder portion 14 provided on the supply fitting 10 and serving to engage and retain the cylinder valve is engaged with the gas cylinder valve in such a manner that the tip of the headless screw 18 extends into and is centered by the standard conical bore provided on the rear side of such gas cylinder valves and the profiled surface 17 for engaging the cylinder valve engages the rear side of the gas cylinder valve. In that operation the headless screw 18 can be so adjusted that the vertical axis of symmetry of the gas cylinder valve, which axis is shown in FIG. 3, and the longitudinal axis of the supply fitting, which axis extends through the headless screw 18 and the supply inlet 12, are at right angles to each other when the gas cylinder valve engages the profiled engaging surface 17. This will ensure a satisfactory insertion of the guiding section 48 into an associated portion of the gas cylinder valve, as will be described more in detail hereinafter.

As soon as the supply fitting 10 has engaged the gas cylinder valve in the position just described, the actuating part 24 of the guiding and actuating member 21, which is initially in the position shown in FIG. 2, is pulled out of the housing 11 against the biasing force of the compression springs 29 so that the ball(s) 32 is or are no longer acted upon by the cam face 34 but can yield into the entrance space 37. The ball(s) 32 can yield because the locking recess 33 has inclined side walls and the piston sleeve 22 is so biased by the compression spring 41 relative to the guiding and actuating member 21 that a disengaging force is exerted on the ball(s) 32.

When the piston sleeve 22 has been released from its locking position, the piston sleeve moves into the associated opening of the gas cylinder valve and moves in said opening into a sealing engagement. By that operation the valve member 23 is lifted from its sealing position to open a supply path leading to the gas cylinder valve. In that phase the piston sleeve 22 is forced by the spring 41 into sealing engagement with the gas cylinder valve. When the guiding and actuating member 21 has subsequently been released, that member 21 is so moved under the action of the compression springs 29 relative to the housing 11 toward the gas cylinder valve that the ball or balls 32 disposed in the associated receiving space(s) engage the cam face 35 end by the latter are radially inwardly forced against the engaging surface 38 on the outside peripheral surface of the piston sleeve 22 so that the latter is non-positively held.

The supply sleeve has now safely and reliably been connected and when the gas cylinder valve has been opened the gas cylinder can be filled. When the filling has been terminated the gas cylinder valve is initially closed. Thereafter the guiding and actuating member 21 is moved out of the housing 11 in order to eliminate the non-positive holding of the piston sleeve 22 by the ball(s) 32. The housing 11 can then be pushed toward the gas cylinder valve so that the piston sleeve 22 can again positively be locked by the ball(s) 32, as is shown in FIG. 2, whereas the valve member 23 seals at the sealing seat 45 to shut off the supply path. When the piston sleeve 22 has been depressed, the profiled engaging surface 17 and the tip 19 of the headless screw 18 can now be removed from the gas cylinder valve and the gas cylinder valve can easily be removed out of the space 16 for receiving the cylinder valve, which space is now available and can laterally be moved out of the receiving opening 15, so that the supply fitting 10 can be removed.

FIGS. 4 to 9 show an alternative illustrative embodiment of a supply fitting 10'. For the sake of simplicity, all elements which are identical or have the same function are provided with the same reference characters and a prime ('). For this reason the descriptions of such parts will be briefer or will be omitted.

The supply fitting 10' comprises a cylindrical housing 11'. A difference from the illustrative embodiment described hereinbefore resides in that the supply fitting 10' comprises an eccentric actuating mechanism 60, which includes an eccentric shaft 66, which is movably mounted in the housing 11' at two points. The eccentric shaft 66 engages an interposed element 70, which in turn engages the piston sleeve 22'. The eccentric shaft 66 can be rotated by means of a lever 72 provided on the outside surface of the housing.

To prevent an inadvertent adjustment of the lever 72 the supply fitting comprises detent means 74, which are indicated by broken lines in FIG. 4 and will be described more in detail with reference to FIGS. 7 to 9.

The detent means 74 comprises a stem 76, which is movably mounted in the housing 11' and is biased toward its engaging position by a spring 75. A pushbutton 78 is secured to the stem 76 at one end thereof and a disk profile 80 is secured to the stem 76 at the other end thereof. Adjacent to the bearing by which the eccentric shaft 66 is mounted in the housing 11, the eccentric shaft comprises a flange 81, which is formed with profiled engaging portion 82, which is engageable by the disk profile 80 and consists of a recess 82 having the configuration of a segment of a circle; see FIG. 9.

The supply fitting 10' differs from the supply fitting 10 by comprising a laterally provided supply inlet 12' consisting of a tubular port 62, which is screwed into the piston sleeve 72' and has a bore 63, which leads to the communicating bore 52'. The tubular port extends through a slot 64 laterally out of the housing 11'. Because the tubular port 62 follows the displacement of the piston sleeve 22', it reciprocates in the slot 64 during the actuation of the eccentric shaft 66.

Figure 4:
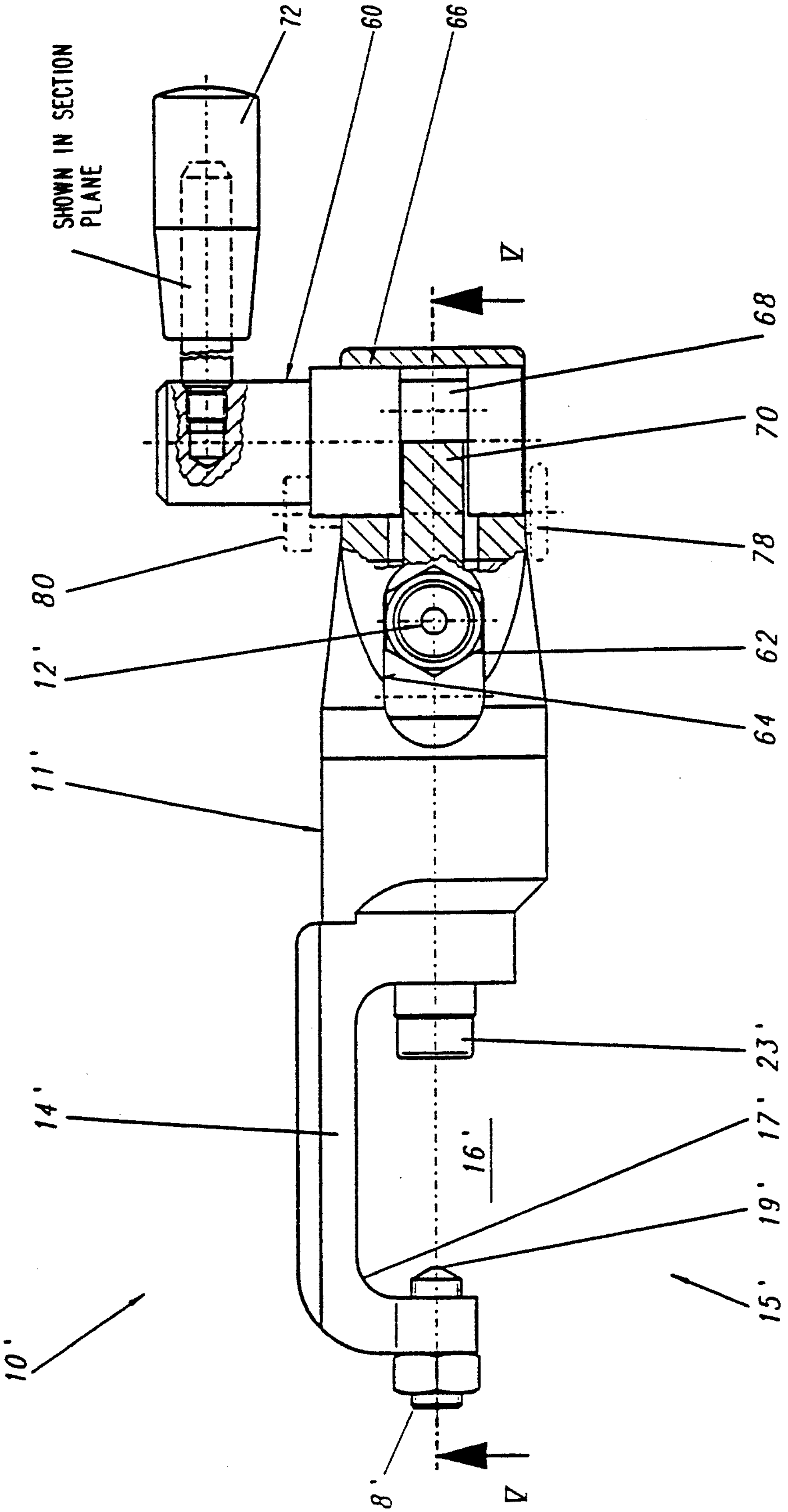
FIG. 4 is a top plan view showing another illustrative embodiment of a supply fitting, which is provided with an eccentric actuating mechanism and has not been attached to a cylinder valve.
Figure 5:
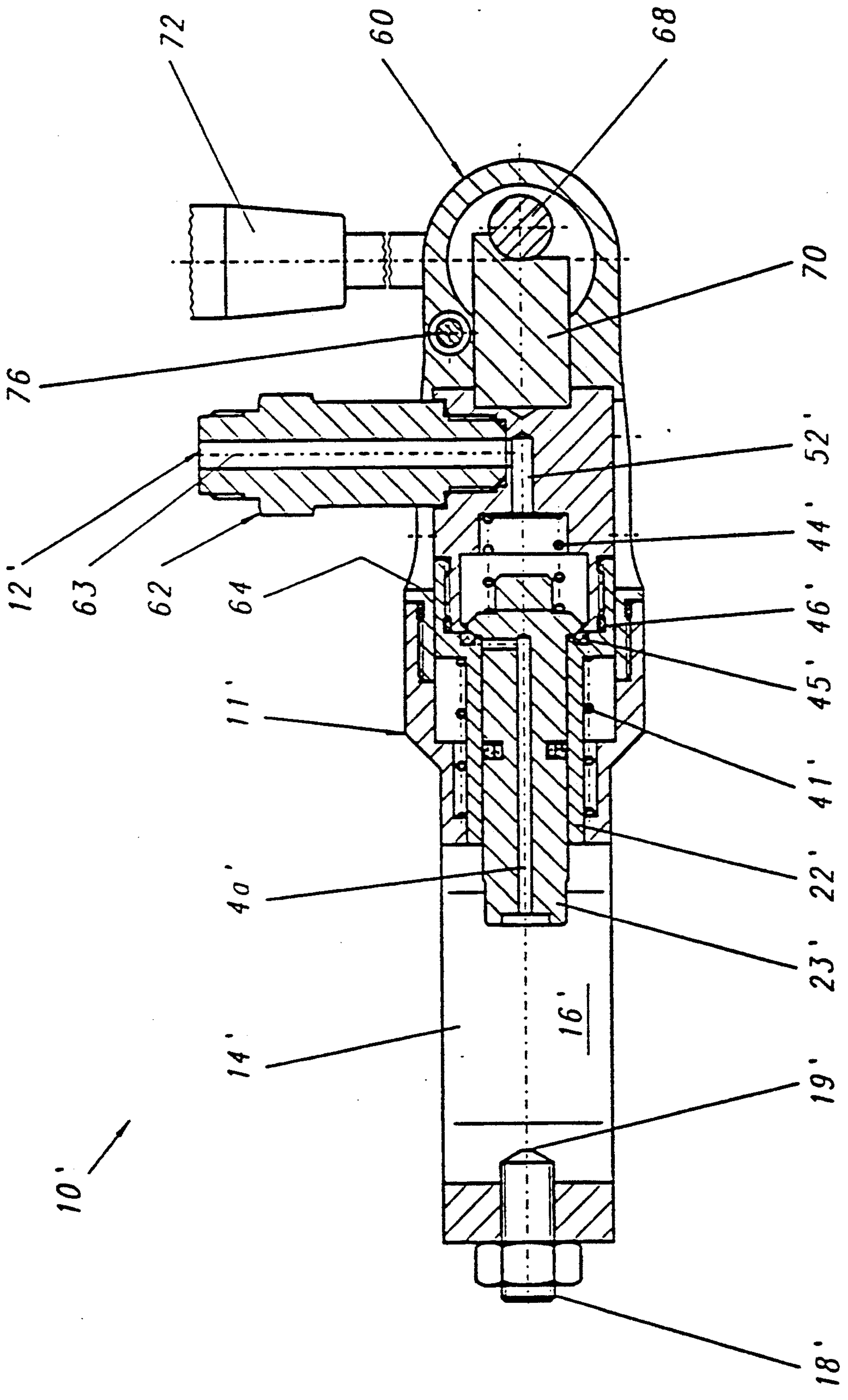
FIG. 5 is a sectional view taken on section line V—V in FIG. 4.

To handle the supply fitting 10' its portion 14' for engaging and retaining a cylinder valve is engaged with a cylinder valve in the position shown in FIGS. 4 and 5. At that time, gas under the supply pressure may be supplied through the tubular port 62 into the interior of the supply fitting although gas is not usually supplied until the supply fitting gas been mounted. The valve member 23' is in the sealing position shown in FIGS. 4 and 5 and by the compression spring 44' is urged into sealing engagement with a sealing portion 46' of the piston sleeve 22'.

A difference from the first illustrative embodiment resides in that the compression spring 41' abuts the housing 11' and the piston sleeve 22' in such a manner that the eccentric portion 68 of the eccentric shaft 66 will always be acted upon by the interposed element 70.

Figure 6:
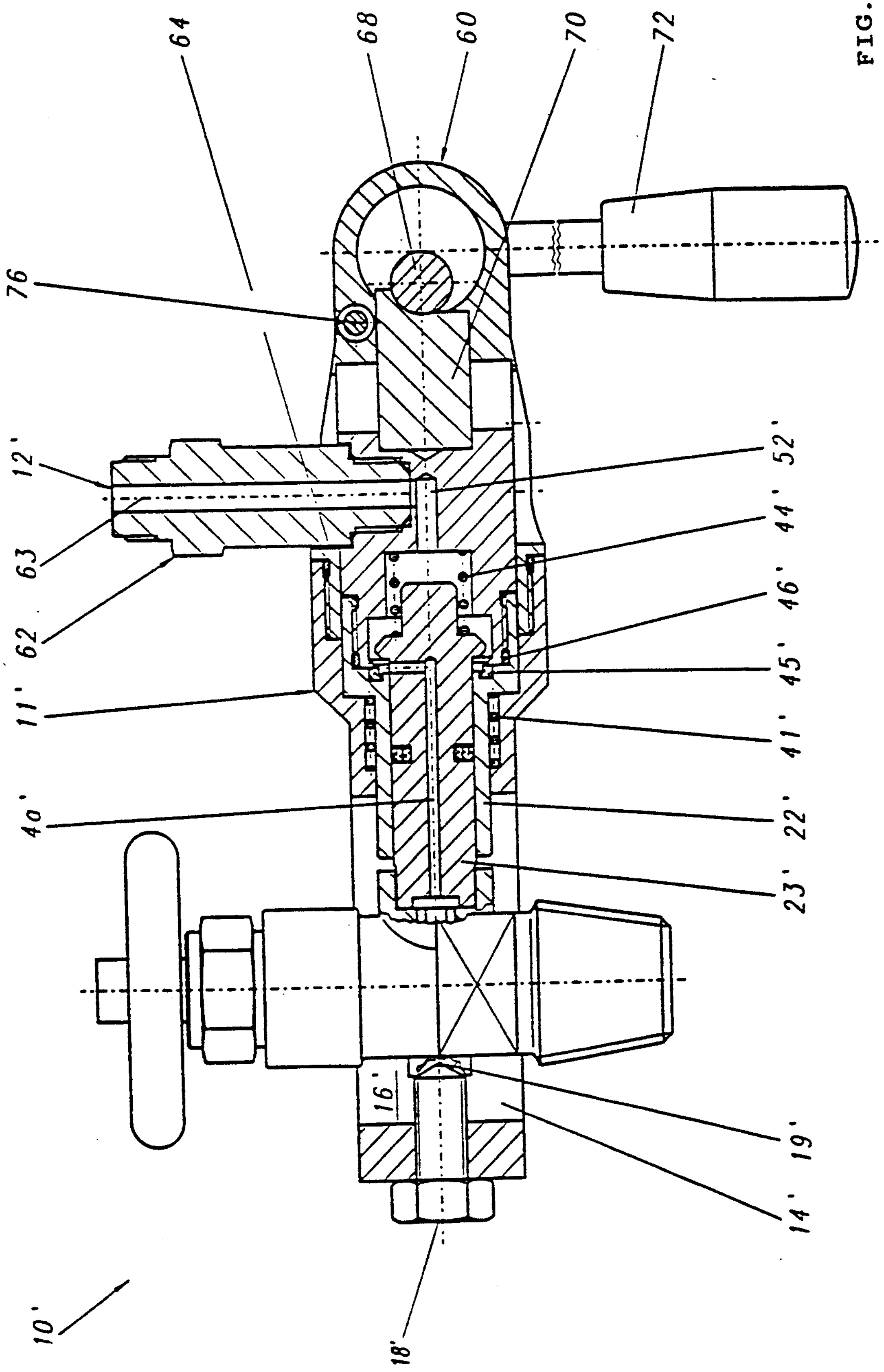
FIG. 6 is a sectional view which is similar to FIG. 5 but shows the supply fitting connected to a cylinder valve.

As soon as the supply fitting has properly been engaged with the gas cylinder valve, it is sufficient to pivotally move the lever 72 so that the eccentric portion 68 is moved from its rear position, shown in FIG. 4, to its forward position, shown in FIG. 6. As a result, the interposed element 70 is caused to displace the piston sleeve 22' forwardly to effect a relative movement between the valve member 23', which is held on the gas cylinder valve, and the piston sleeve 22' so that the valve member 23' is lifted from the associated sealing seat 46' and opens a passage for the flow of the gas to be supplied to the gas cylinder.

As is apparent from FIG. 4 the detent means are initially in a depressed position, in which the disk 80 rests on the profile flange 81 of the eccentric shaft 66. When the lever 72 is rotated and the intended connected position has been reached, the profiled engaging surface 82 assumes a position in which the disk profile 80 can be pulled by the spring 75 into and be positively locked by the disk profile 80.

As a result, the parts are reliably locked in their connected position against an inadvertent adjustment of the lever 72 or of the eccentric actuating mechanism. For a release it is sufficient to depress the button 78 against the action of the compression spring 75 so as to disengage the disk profile 80 from the engaging profile 82. The eccentric shaft 66 can then freely be rotated while the disk 80 rests on the profile flange 81.

I claim:

1. A supply fitting for gas cylinder valves, particularly of acetylene cylinders, consisting of
   - a housing provided with a supply inlet and a portion for engaging and retaining a gas cylinder valve, which portion is formed with a supply outlet,
   - a piston sleeve, which is movably mounted and sealed in the housing and displaceable against the force of a spring and comprises a valve member, which is formed with a through passage and is biased by a spring to its sealing position and is adapted to open a supply passage through the housing after the supply fitting has been attached to a gas cylinder valve, and means for holding the piston sleeve in position before and after the supply fitting has been attached to a gas cylinder valve.

2. A supply fitting according to claim 1, characterized in that the holding means comprise at least one coupling element, which positively holds the piston sleeve in position at least before it is connected.

3. A supply fitting for gas cylinder valves, particularly of acetylene cylinders, consisting of a housing provided with a supply inlet and a portion for engaging and retaining a gas cylinder valve, which portion is formed with a supply outlet, a piston sleeve, which is movably mounted and sealed in the housing and displaceable against the force of a spring and comprises a valve member, which is formed with a through passage and is biased by a spring to its sealing position and is adapted to open a supply passage through the housing after the supply fitting has been attached to a gas cylinder valve, and means for holding the piston sleeve in position before and after the supply fitting has been attached to a gas cylinder valve characterized in that a guiding and actuating member is provided for the holding means, which guiding and actuating member is biased relative to the housing toward the portion for engaging and retaining the cylinder valve.

4. A supply fitting according to claim 3, characterized in that the guiding and actuating member is slidably mounted in the housing and is provided with the supply inlet and with a passage leading to the valve member.

5. A supply fitting for gas cylinder valves, particularly of acetylene cylinders, consisting of a housing provided with a supply inlet and a portion for engaging and retaining a gas cylinder valve, which portion is formed with a supply outlet, a piston sleeve, which is movably mounted and sealed in the housing and displaceable against the force of a spring and comprises a valve member, which is formed with a through passage and is biased by a spring to its sealing position and is adapted to open a supply passage through the housing after the supply fitting has been attached to a gas cylinder valve, and means for holding the piston sleeve in position before and after the supply fitting has been attached to a gas cylinder valve, wherein a guiding and actuating member is provided for the holding means, which guiding and actuating member is biased relative to the housing toward the portion for engaging and retaining the cylinder valve, characterized in that the guiding and actuating member has at least one cagelike passage for receiving an associated coupling element, the surrounding housing has associated internal receiving spaces provided with cam faces, and the piston sleeve is formed on its outside periphery with respective associated locking recesses for locking the piston sleeve in position at least before it is connected to the cylinder valve.

6. A supply fitting according to claim 5, characterized in that the piston sleeve is provided on its outside periphery with a surface with which each coupling element can be non-positively engaged under the action of a cam face at the receiving space of the housing.

7. A supply fitting according to claim 2, characterized in that each coupling element consists of a ball.

8. A supply fitting according to claim 5, characterized in that each coupling element consists of a ball.

9. A supply fitting for gas cylinder valves, particularly of acetylene cylinders, consisting of a housing provided with a supply inlet and a portion for engaging and retaining a gas cylinder valve, which portion is formed with a supply outlet, a piston sleeve, which is movably mounted and sealed in the housing and displaceable against the force of a spring and comprises a valve member, which is formed with a through passage and is biased by a spring to its sealing position and is adapted to open a supply passage through the housing after the supply fitting has been attached to a gas cylinder valve, and means for holding the piston sleeve in position before and after the supply fitting has been attached to a gas cylinder valve, characterized in that the piston sleeve contains an interposed ring, which has a stepped extension and provides an abutment for a compression spring for biasing the piston sleeve, and the compression spring is guided by portions of the guiding and actuating member and by the piston sleeve.

10. A supply fitting for gas cylinder valves, particularly of acetylene cylinders, consisting of a housing provided with a supply inlet and a portion for engaging and retaining a gas cylinder valve, which portion is formed with a supply outlet, a piston sleeve, which is movably mounted and sealed in the housing and displaceable against the force of a spring and comprises a valve member, which is formed with a through passage and is biased by a spring to its sealing position and is adapted to open a supply passage through the housing after the supply fitting has been attached to a gas cylinder valve, and means for holding the piston sleeve in position before and after the supply fitting has been attached to a gas cylinder valve, wherein a guiding and actuating member is provided for the holding means, which guiding and actuating member is biased relative to the housing toward the portion for engaging and retaining the cylinder valve, characterized in that the piston sleeve contains an interposed ring, which has a stepped extension and provides an abutment for a compression spring for biasing the piston sleeve, and the compression spring is guided by portions of the guiding and actuating member and by the piston sleeve.

11. A supply fitting according to claim 9, characterized in that the interposed ring provides also an abutment for the compression spring for the valve member.

12. A supply fitting according to claim 9, characterized in that the interposed ring provides also an abutment for the compression spring for the valve member.

13. A supply fitting according to claim 1, characterized in that the piston sleeve comprises a tapered guiding portion, which serves to guide the valve member and extends into a cylinder valve-receiving space formed in the engaging and retaining portion, the sealing seat for the valve member is formed in the tapered portion and when the valve member is in its seated position is contacted by a sealing ring of the valve member, and the valve member in its seated position protrudes beyond the guiding section into the space for receiving the cylinder valve.

14. A supply fitting for gas cylinder valves, particularly of acetylene cylinders, consisting of a housing provided with a supply inlet and a portion for engaging and retaining a gas cylinder valve, which portion is formed with a supply outlet, a piston sleeve, which is movably mounted and sealed in the housing and displaceable against the force of a spring and comprises a valve member, which is formed with a through passage and is biased by a spring to its sealing position and is adapted to open a supply passage through the housing after the supply fitting has been attached to a gas cylinder valve, and means for holding the piston sleeve in position before and after the supply fitting has been attached to a gas cylinder valve wherein a guiding and actuating member is provided for the holding means, which guiding and actuating member is biased relative to the housing toward the portion for engaging and retaining the cylinder valve, the piston sleeve is formed in its outside periphery with a recess for locking the piston sleeve in position before the supply fitting is attached to a gas cylinder valve, characterized in that the piston sleeve comprises a tapered guiding portion, whch serves to guide the valve member and extends into a cylinder valve-receiving space formed in the engaging and retaining portion, the sealing seat for the valve member is formed in the tapered portion and when the valve member is in its seated position is contacted by a sealing ring of the valve member, and the valve member in its seated position protrudes beyond the guiding section into the space for receiving the cylinder valve.

15. A supply fitting for gas cylinder valves, particularly of acetylene cylinders, consisting of a housing provided with a supply inlet and a portion for engaging and retaining a gas cylinder valve, which portion is formed with a supply outlet, a piston sleeve, which is mounted and sealed in the housing and displaceable against the force of a spring and comprises a valve member, which is formed with a through passage and is biased by a spring to its sealing position and is adapted to open a supply passage through the housing after the supply fitting has been attached to a gas cylinder valve, and means for holding the piston sleeve in position before and after the supply fitting has been attached to a gas cylinder valve, characterized in that the portion for engaging and retaining the cylinder valve has a lateral opening for receiving the cylinder valve.

16. A supply fitting according to claim 15, characterized in that a profiled surface for engaging a cylinder valve is formed in the portion for engaging and retaining the cylinder valve.

17. A supply fitting according to claim 15, characterized in that the portion for retaining and engaging the cylinder valve comprises an adjustable engagement-controlling element opposite to the piston sleeve.

18. A supply fitting according to claim 1, characterized in that at least one handling recess is provided on the outside of the housing.

19. A supply fitting for gas cylinder valves, particularly of acetylene cylinders, consisting of a housing provided with a supply inlet and a portion for engaging and retaining a gas cylinder valve, which portion is formed with a supply outlet, a piston seleve, which is movably mounted and sealed in the housing and displaceable against the force of a spring and comprises a valve member, which is formed with a through passage and is biased by a spring to its sealing position and is adapted to open a supply passage through the housing after the supply fitting has been attached to a gas cylinder valve, and means for holding the piston sleeve in position before and after the supply fitting has been attached to a gas cylinder valve, wherein the means for holding the piston sleeve in position comprise an eccentric actuating mechanism.

20. A supply fitting according to claim 19, characterized in that the eccentric actuating mechanism axially engages the piston sleeve.

21. A supply fitting according to claim 19, characterized in that the eccentric actuating mechanism comprises an eccentric shaft, which is movably mounted in the housing at least at one point and has an eccentric portion, which is engaged by an interposed element for exerting a force on the piston sleeve, and the eccentric shaft can be rotated from the outside by means of the lever.

22. A supply fitting for gas cylinder valves, particularly of acetylene cylinders, consisting of a housing provided with a supply inlet and a portion for engaging and retaining a gas cylinder valve, which portion is formed with a supply outlet, a piston sleeve, which is movably mounted and sealed in the housing and displaceable against the force of a spring and comprises a valve member, which is formed with a through passage and is biased by a spring to its sealing position and is adapted to open a supply passage through the housing after the supply fitting has been attached to a gas cylinder valve, and means for holding the piston sleeve in position before and after the supply fitting has been attached to a gas cylinder valve, characterized in that the eccentric actuating mechanism comprises detent means for preventing an inadvertent adjustment.

23. A supply fitting according to claim 22, characterized in that the detent means comprise a stem, which is movably mounted in the housing and is biased in the engaging direction and is provided with a pushbutton at one end and with a disk profile at the other end, and a profiled section for engaging the disk profile is formed adjacent to the bearing means and to the eccentric shaft.

24. A supply fitting for gas cylinder valves, particularly of acetylene cylinders, consisting of a housing provided with a supply inlet and a portion for engaging and retaining a gas cylinder valve, which portion is formed with a supply outlet, a piston sleeve, which is movably mounted and sealed in the housing and displaceable against the force of a spring and comprises a valve member, which is formed with a through passage and is biased by a spring to its sealing position and is adapted to open a supply passage through the housing after the supply fitting has been attached to a gas cylinder valve, and means for holding the piston sleeve in position before and after the supply fitting has been attached to a gas cylinder valve, wherein the means for holding the piston sleeve in position comprise an eccentric actuating mechanism, characterized in that the supply inlet comprises a tubular port, which is connected to the piston sleeve.

25. A supply sleeve according to claim 24, characterized in that the tubular port is angled and secured to the piston sleeve and laterally extends out of the housing through a slot.

* * * * *